US008488923B2

(12) United States Patent
Na et al.

(10) Patent No.: US 8,488,923 B2
(45) Date of Patent: Jul. 16, 2013

(54) MULTIMODE OPTICAL COUPLER INTERFACES

(75) Inventors: Yun-Chung Na, Palo Alto, CA (US); Tao Yin, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 583 days.

(21) Appl. No.: 12/749,196

(22) Filed: Mar. 29, 2010

(65) Prior Publication Data

US 2011/0235968 A1    Sep. 29, 2011

(51) Int. Cl.
*G02B 6/26* (2006.01)

(52) U.S. Cl.
USPC ................................. 385/28; 385/14

(58) Field of Classification Search
USPC ........................................ 385/28, 14
See application file for complete search history.

(56) References Cited

U.S. PATENT DOCUMENTS

| | | | | |
|---|---|---|---|---|
| 6,396,984 | B1 * | 5/2002 | Cho et al. | 385/43 |
| 6,580,850 | B1 * | 6/2003 | Kazarinov et al. | 385/28 |
| 2004/0114869 | A1 * | 6/2004 | Fike et al. | 385/43 |
| 2005/0152635 | A1 * | 7/2005 | Paddon et al. | 385/14 |
| 2008/0002928 | A1 * | 1/2008 | Li | 385/14 |
| 2008/0138008 | A1 * | 6/2008 | Tolstikhin et al. | 385/14 |
| 2009/0060527 | A1 * | 3/2009 | Foster et al. | 398/186 |
| 2009/0245728 | A1 * | 10/2009 | Cherchi et al. | 385/28 |

OTHER PUBLICATIONS

Written Opinion and Int'l Search Report for Int'l Patent Application No. PCT/US2011/030358 mailed Jan. 2, 2012, 10 pgs.
Thurston, R.N., et al., "Two-dimensional control of mode size in optical channel waveguides by lateral channel tapering", *Optics Letter*, vol. 16, No. 5, Mar. 1, 1991, 306-308

* cited by examiner

*Primary Examiner* — Charlie Peng
*Assistant Examiner* — Peter Radkowski
(74) *Attorney, Agent, or Firm* — Blakely, Sokoloff, Taylor & Zafman LLP

(57) ABSTRACT

Optical interfaces that may be employed between large-core optical fibers and chip-scale optoelectronic devices. Described herein are couplers that improve the tolerance of misalignment when a single mode (SM) fiber is used as waveguide input. This enables the possibility of passive/automatic alignment and therefore reduces the production cost. The coupler also serves as a spot-size converter that reduces the spot size and is suitable for applications where a waveguide mode with small cross-section area is of particular importance. One such example can be a waveguide-based SiGe or III-V semiconductor photodetector in which the vertical size of its waveguide mode should be as small as few microns.

24 Claims, 4 Drawing Sheets

MULTIMODE OPTICAL COUPLER INTERFACES

TECHNICAL FIELD

Embodiments of the invention relate to optical couplers. More particularly, embodiments of the invention relate to multimode optical coupler interfaces for interfacing, for example, optical fibers and photonic integrated circuits.

BACKGROUND

Coupling light from fiber to waveguide with high efficiency is crucial in the development of integrated photonics. In particular, single mode (SM) fiber to waveguide coupling without active/manual alignment is very challenging because of the small spot size involved.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are optical interfaces that may be employed between large-core optical fibers and chip-scale optoelectronic devices. Photons can be coupled efficiently from one side to another in a fully coherent way. Described herein are couplers that improve the tolerance of misalignment when a single mode (SM) fiber is used as waveguide input. This enables the possibility of passive/automatic alignment and therefore reduces the production cost. The coupler also serves as a spot-size converter that reduces the spot size and is suitable for applications where a waveguide mode with small cross-section area is of particular importance. One such example can be a waveguide-based SiGe or III-V semiconductor photodetector in which the vertical size of its waveguide mode should be as small as few microns.

The optical couplers may be used for interfacing SM light source and chip-scale photonic devices. In one embodiment, components include 1) relatively large multimode (MM) waveguide, 2) relatively small SM waveguide array/MM slab waveguide, and 3) inverted-taper structure. The description that follows assumes that the material absorption loss at the wavelength of interest is negligible, which is true for Silicon (Si) and Silicon Germanium (SiGe) with small Germanium (Ge) composition at telecom wavelengths such as 1.31 μm and 1.55 μm.

Figure 1:
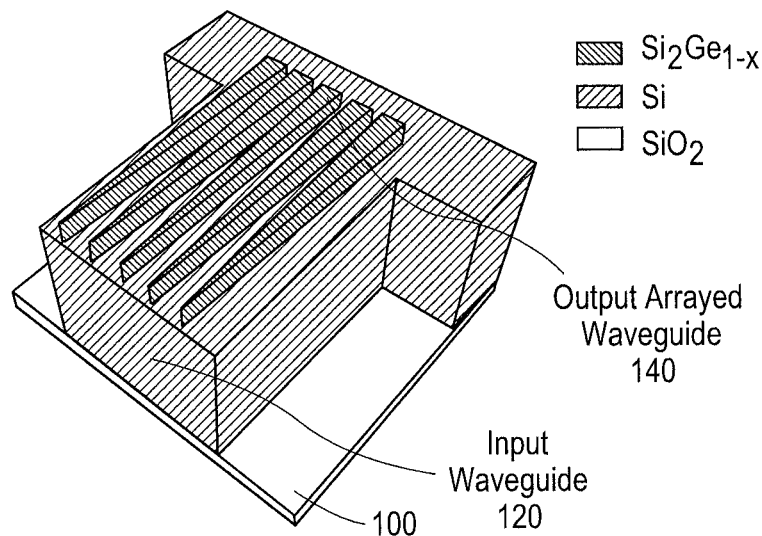
FIG. 1 illustrates one embodiment of an optical coupler having an output arrayed waveguide.

FIG. 1 illustrates one embodiment of an optical coupler having an output arrayed waveguide. While the example of FIG. 1 demonstrates an output arrayed waveguide sitting on top of an input waveguide, in alternate embodiments the output waveguide can also be embedded in the input waveguide which may further improve coupling strength.

The optical coupler is created or assembled on substrate 100. In one embodiment, substrate 100 is a Silicon Dioxide ($SiO_2$) substrate. In alternate embodiments, other substrates may be used, for example, gallium arsenide (GaAs). The optical coupler includes input waveguide 120 on substrate 100 to receive an optical signal from an optical fiber (not illustrated in FIG. 1). In one embodiment, input waveguide 120 is created from Silicon (Si). In alternate embodiments, other materials can be used, for example, aluminum gallium arsenide (AlGaAs).

The optical coupler further includes output arrayed waveguide 140 that is created or placed on top of input waveguide 120. Specific sizes, relationships, and other design considerations are discussed in greater detail below. In one embodiment, output arrayed waveguide 140 is created from Silicon Germanium ($S_xGe_{1-x}$). In alternate embodiments, other materials can be used, for example, aluminum arsenide (AlAs).

In one embodiment, the input port of input waveguide 120 of the optical coupler is designed to be a MM waveguide with adequate cross-section area (e.g., ~10 μm×10 μm) to interface an external SM fiber. This allows the coupling from the SM fiber into the optical coupler with negligible loss.

In one embodiment, output arrayed waveguide 140 is an array of SM waveguides with small cross-section area (e.g., ~1 μm×1 μm) sits on top of MM input waveguide 120. In one embodiment, the widths of the individual waveguides of output arrayed waveguide 140 are tapered adiabatically in an increasing fashion. The number of the SM waveguides depends on the number of modes in the MM waveguide to be converted. In the example of FIG. 1, output arrayed waveguide 140 includes five SM waveguides as an example. Photons injected into the MM input waveguide 120 will be extracted by SM waveguide array 140 because of coherent evanescent coupling. The efficiency is mainly constrained by the inverted-taper loss due to non-adiabaticity.

Figure 2:
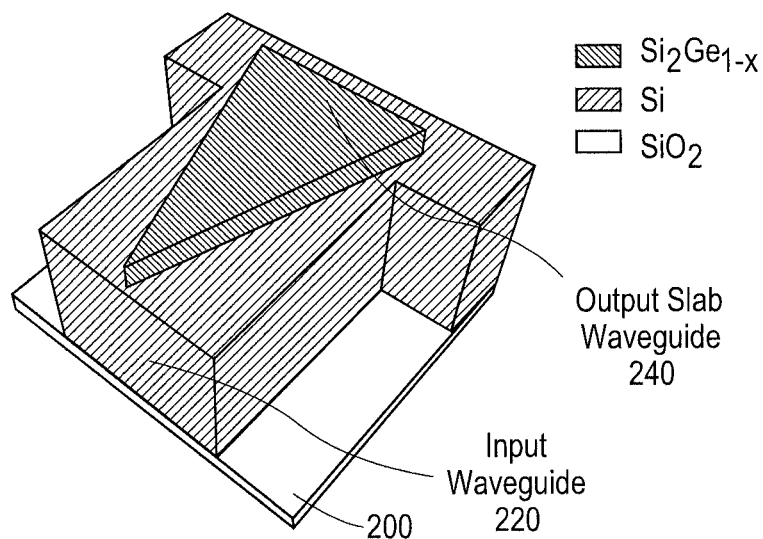
FIG. 2 illustrates one embodiment of an optical coupler having a single output waveguide.

FIG. 2 illustrates one embodiment of an optical coupler having a single output waveguide. While the example of FIG. 2 demonstrates an output waveguide sitting on top of an input waveguide, in alternate embodiments the output waveguide can also be embedded in the input waveguide which may further improve coupling strength.

The optical coupler is created or assembled on substrate 200. In one embodiment, substrate 200 is a $SiO_2$ substrate. In alternate embodiments, other substrates may be used, for example, gallium arsenide (GaAs). The optical coupler includes input waveguide 220 on substrate 200 to receive an optical signal from an optical fiber (not illustrated in FIG. 2). In one embodiment, input waveguide 220 is created from Silicon. In alternate embodiments, other materials can be used, for example, aluminum gallium arsenide (AlGaAs).

The optical coupler further includes single output waveguide 240 that is created or placed on top of input waveguide 220. Specific size, relationships, and other design considerations are discussed in greater detail below. In one embodiment, single output waveguide 240 is created from Silicon Germanium ($S_xGe_{1-x}$). In alternate embodiments, other materials can be used, for example, aluminum arsenide (AlAs).

In one embodiment, the input port of input waveguide 220 of the optical coupler is designed to be a MM waveguide with adequate cross-section area (e.g., ~10 μm×10 μm) to interface an external SM fiber. This allows the coupling from the SM fiber into the optical coupler with negligible loss.

In one embodiment, single output waveguide 240 is a SM waveguide with small thickness (e.g., ~1 μm) sits on top of MM input waveguide 220. In one embodiment, the width of single output waveguide 240 is tapered adiabatically in an increasing fashion. Photons injected into the MM input waveguide 220 will be extracted by SM output waveguide 240 because of coherent evanescent coupling. The efficiency is mainly constrained by the inverted-taper loss due to non-adiabaticity.

An important benefit of the optical couplers describe herein is the tolerance of misalignment. Assuming a standard SM fiber with NA ~0.14 is coupled to a 10 μm×10 μm SOI (Silicon-on-Insulator) strip waveguide, the maximum number of modes can be excited is about three. Profiles for the three modes are provided in FIG. 3. Because the optical couplers described herein can couple not only the fundamental mode but also higher-order modes into the small waveguide array, it offers a larger tolerance of misalignment compared to the conventional designs where only the fundamental mode can be coupled.

The tolerance of fiber center-to-waveguide center offset is calculated as ~16 μm$^2$ for the optical coupler described herein as compared to ~7.8 μm$^2$ for the conventional design. Such an improvement enables the possibility of passive/automatic alignment and therefore reduces the optical coupler production cost. Realistically, the improvement can be even larger because in the example provided above, the coupling efficiency of fundamental mode was artificially maximized by an appropriate spot size.

Figure 4:
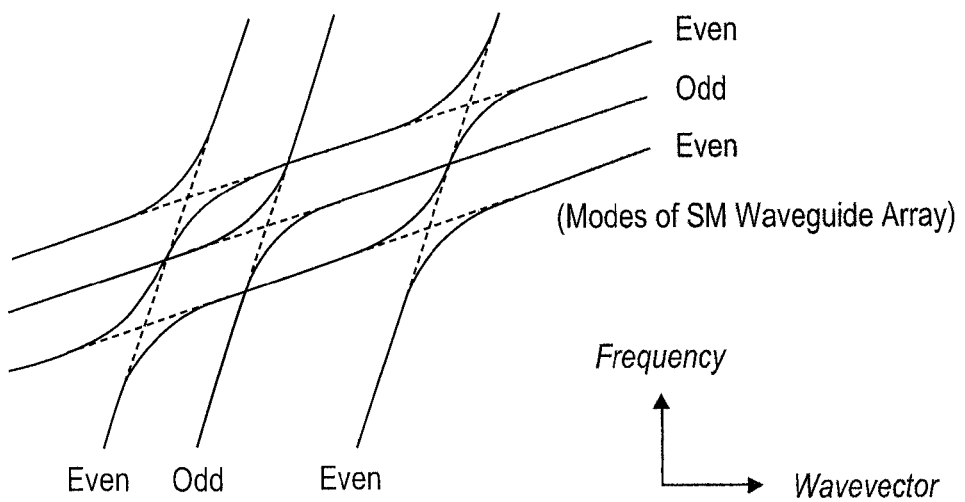
FIG. 4 is a dispersion diagram that illustrates the operation of the optical couplers described herein.

FIG. 4 is a dispersion diagram that illustrates the operation of the optical couplers described herein. The dispersion diagram of FIG. 4 illustrates the wavevector-frequency relation for the optical couplers. The couplers possess horizontal mirror symmetry so that the waveguide modes can be categorized into either even or odd parity. For the MM waveguide (SM waveguide array), the dispersions of its lowest three modes are indicated by the solid lines with larger slope (smaller slope). Parities are labeled correspondingly.

The MM waveguide can only interact with the SM waveguide array among modes with the same parity, which causes five (instead of nine) normal-mode splittings as indicated by the dashed lines. Assume the input wavevectors/frequencies are on the lower end of MM waveguide dispersions, which is determined by the SM fiber excitation condition. By adiabatically tapering the widths of SM waveguides in an increasing fashion, the dispersions of SM waveguide array can be "pulled" toward the large wavevector/low frequency side, and eventually sweep the input wavevectors/frequencies. This would transfer the optical power in the MM waveguide into the SM waveguide array adiabatically.

Note that the number of SM waveguides used can be deducted from the dispersions. As an example where (00), (10), (01), (11), (20), (02), (21), (12), (30) are the lowest nine modes in the MM waveguide, one needs nine SM waveguides to capture all of them due to parity selection.

Figure 5:
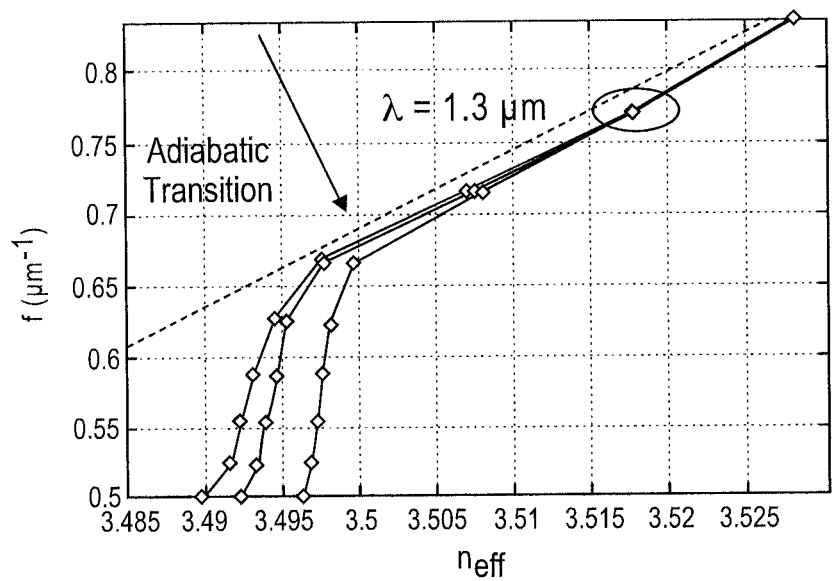
FIG. 5 provides a result from a simulation of one embodiment of an optical coupler as described herein.

FIG. 5 provides a result from a simulation of one embodiment of an optical coupler as described herein. The simulation corresponding to FIG. 5 is based on three small SiGe waveguides (1 μm×1 μm; n=3.6) with inter-distance of 0.5 μm placed on top of a large Si waveguide (10 μm×8 μm; n=3.5), and surrounded by SiO2 (n=1.447). Note that for 0.5 μm (or smaller) inter-distance, the three SiGe waveguides are coupled to each other so that the degenerate modes of theirs can form definite parities.

Figure 3:
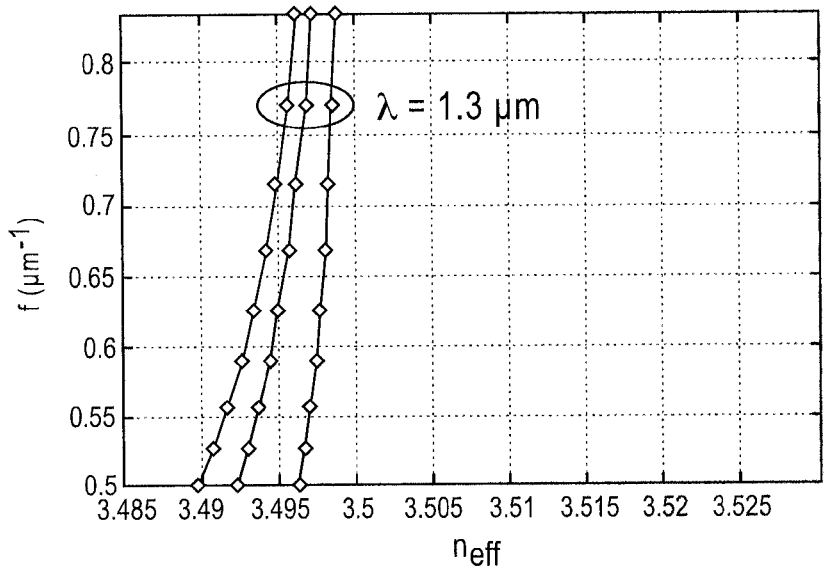
FIG. 3 is a mode profile for an example embodiment in which a single mode fiber (NA~0.14) is coupled with a 10 μm by 10 μm silicon-on-insulator (SOI) strip waveguide.

The dispersions of the input port are the same as for FIG. 3, where the lowest three modes of the silicon waveguide at wavelength of 1.3 μm are plotted. After an adiabatic transition by increasing the widths of three SiGe waveguides, the dispersions of the output port are changed as shown in FIG. 5. The mode powers are now converted from Si waveguide to SiGe waveguides with corresponding parities. For simplicity, the simulations here consider only TM polarization but can be extended to TE polarization. The length of inverted-taper is expected to be smaller than 1 mm with optimum design.

Note that a single MM slab waveguide (as shown in FIG. 2) instead of SM waveguide array (shown in FIG. 1) can also perform similar functions. The dimensions of the output port will be similar but the overall taper length can be longer for the case of MM slab waveguide of FIG. 2.

Figure 6:
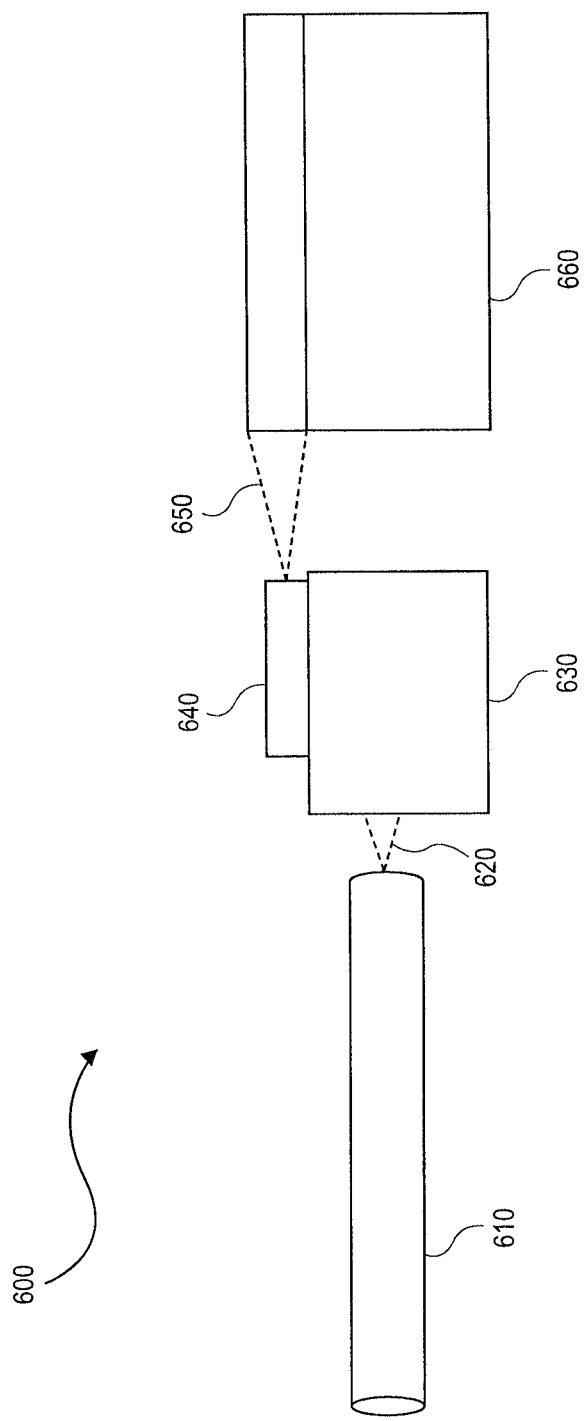
FIG. 6 is a block diagram of one embodiment of an optical system utilizing an optical coupler as described herein.

FIG. 6 is a block diagram of one embodiment of an optical system utilizing an optical coupler as described herein. While the example of FIG. 6 demonstrates an output waveguide sitting on top of an input waveguide, in alternate embodiments the output waveguide can also be embedded in the input waveguide which may further improve coupling strength.

Optical system 600 utilizes the optical coupler as an interface between an optical fiber and an optoelectronic device. Optical fiber 610 can be any type of single mode optical fiber known in the art. Optical fiber 610 carries an optical signal from a source (not illustrated in FIG. 6). Optical fiber 610 is optically aligned with input waveguide 630 so that input optical signal 620 is received by input waveguide 630.

Input waveguide 630 and output waveguide 640 together provide an optical coupler as described in greater detail above. Output waveguide 640 is optically aligned with optoelectronic device 660 so that output optical signal 650 is received by optoelectronic device 660, which may be any type of optoelectronic device known in the art. The optical couplers described herein may be used in other situations as well. FIG. 6 is merely one example of a use of an optical coupler.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An multi-mode optical coupler comprising: an input multi-mode waveguide to receive an optical signal from a single mode optical fiber; one or more single mode output waveguides optically coupled with the input multi-mode waveguide to form a single mode waveguide array, the one or more single mode output waveguides to receive the excited multiple modes caused by fiber misalignment, wherein the widths of the single mode output waveguides are adiabatically tapered in an increasing fashion to pull dispersions of the single mode waveguides toward a low frequency side and sweep the input frequencies to transfer optical power in the multimode waveguide into the single mode waveguide array adiabatically, wherein optical couplers to couple the one or more single mode output waveguides with the input multi-mode waveguide possess horizontal mirror symmetry to categorize the waveguide modes into either even or odd parity and the multi-mode waveguide can only interact with the single-mode waveguide array among modes with the same polarity to cause a subset of normal-mode splittings.

2. The multi-mode optical coupler of claim 1 wherein the one or more single mode output waveguides is embedded within or on top of the input multi-mode waveguide.

3. The multi-mode optical coupler of claim 1 wherein the one or more single mode output waveguides comprise single mode waveguides having adiabatically tapered widths.

4. The multi-mode optical coupler of claim 1 wherein the multi-mode input waveguide is at least ten times thicker than the one or more single mode output waveguides.

5. The multi-mode optical coupler of claim 1 wherein the multi-mode input waveguide comprises a silicon (Si) optical waveguide.

6. The multi-mode optical coupler of claim 1 wherein the multi-mode input waveguide comprises an aluminum gallium arsenide (AlGaAs) waveguide.

7. The multi-mode optical coupler of claim 1 wherein the one or more single mode output waveguides comprise aluminum arsenide (AlAs) optical waveguides.

8. The multi-mode optical coupler of claim 1 wherein the one or more single mode output waveguides comprise silicon germanium (SiGe) optical waveguides.

9. The multi-mode optical coupler of claim 8 wherein the one or more SiGe single mode output waveguides have a composition of $Si_xGe_{1-x}$.

10. An optical system comprising: a single mode optical fiber to transmit an optical signal; an input multi-mode waveguide to receive the optical signal from the single mode optical fiber; one or more single mode output waveguides having adiabatically tapered widths optically coupled with the input multi-mode waveguide, the one or more single mode output waveguides to receive the excited multiple modes caused by fiber misalignment, wherein the widths of the single mode output waveguides are adiabatically tapered in an increasing fashion to pull dispersions of the single mode waveguides toward a low frequency side and sweep the input frequencies to transfer optical power in the multi-mode waveguide into the single mode waveguide array adiabatically, wherein optical couplers to couple the one or more single mode output waveguides with the input multi-mode waveguide possess horizontal mirror symmetry to categorize the waveguide modes into either even or odd parity and the multi-mode waveguide can only interact with the single-mode waveguide array among modes with the same polarity to cause a subset of normal-mode splittings.

11. The optical system of claim 10 wherein the one or more single mode output waveguides is embedded within or on top of the input multi-mode waveguide.

12. The optical system of claim 10 wherein the multi-mode input waveguide is at least ten times thicker than the one or more single mode output waveguides.

13. The optical system of claim 10 further comprising one or more optoelectronic devices optically coupled with the one or more output waveguides.

14. The optical system of claim 10 wherein the multi-mode input waveguide comprises a silicon (Si) optical waveguide.

15. The optical system of claim 10 wherein the multi-mode input waveguide comprises an aluminum gallium arsenide (AlGaAs) waveguide.

16. The optical system of claim 10 wherein the one or more single mode output waveguides comprise aluminum arsenide (AlAs) optical waveguides.

17. The optical system of claim 10 wherein the one or more single mode output waveguides comprise silicon germanium (SiGe) optical waveguides.

18. The optical system of claim 17 wherein the one or more SiGe single mode output waveguides have a composition of $Si_xGe_{1-x}$.

19. A method for manufacturing a multi-mode optical coupler, the method comprising: creating a multi-mode silicon (Si) strip waveguide on a silicon dioxide (SiO2) substrate; and creating a plurality of silicon germanium (SiGe) single mode output waveguides on a face of the Si strip waveguide opposite the SiO2 substrate, wherein the output waveguides have adiabatically tapered widths, wherein the widths of the single mode output waveguides are adiabatically tapered in an increasing fashion to pull dispersions of the single mode waveguides toward a low frequency side and sweep the input frequencies to transfer optical power in the multi-mode Si strip waveguide into the single mode waveguide array adiabatically, wherein optical couplers to couple the one or more single mode output waveguides with the input multi-mode waveguide possess horizontal mirror symmetry to categorize the waveguide modes into either even or odd parity and the multi-mode waveguide can only interact with the single-mode waveguide array among modes with the same polarity to cause a subset of normal-mode splittings.

20. The method of claim 19 wherein the multi-mode input waveguide is at least ten times thicker than the output waveguides.

21. The method of claim 19 wherein the SiGe output waveguides have a composition of $Si_xGe_{1-x}$.

22. A method for manufacturing a multi-mode optical coupler, the method comprising: creating a multi-mode silicon (Si) strip waveguide on a silicon dioxide (SiO2) substrate; and creating a single silicon germanium (SiGe) output waveguide on a face of the Si strip waveguide opposite the SiO2 substrate, wherein the output waveguides have adiabatically tapered widths, wherein the widths of the single mode output waveguides are adiabatically tapered in an increasing fashion to pull dispersions of the single mode waveguides toward a low frequency side and sweep the input frequencies to transfer optical power in the multi-mode Si strip waveguide into the single mode waveguide array adiabatically, wherein optical couplers to couple the one or more single mode output waveguides with the input multi-mode waveguide possess horizontal mirror symmetry to categorize the waveguide modes into either even or odd parity and the multi-mode waveguide can only interact with the single-mode waveguide array among modes with the same polarity to cause a subset of normal-mode splittings.

23. The method of claim 22 wherein the multi-mode input waveguide is at least ten times thicker than the output waveguide.

24. The method of claim 22 wherein the SiGe output waveguides have a composition of $Si_xGe_{1-x}$.

* * * * *

UNITED STATES PATENT AND TRADEMARK OFFICE
CERTIFICATE OF CORRECTION

PATENT NO. : 8,488,923 B2
APPLICATION NO. : 12/749196
DATED : July 16, 2013
INVENTOR(S) : Yun-Chung Na and Tao Yin It is certified that error appears in the above-identified patent and that said Letters Patent is hereby corrected as shown below:

In the Specification

Column 1, Line 3, please insert after title of invention

-- "GOVERNMENT INTEREST STATEMENT

This invention was made with Government support under H98230-08-3-0011 awarded by Department of Defense. The Government has certain rights in this invention" --

Signed and Sealed this
Sixth Day of October, 2015

Michelle K. Lee
*Director of the United States Patent and Trademark Office*